Figure 1:
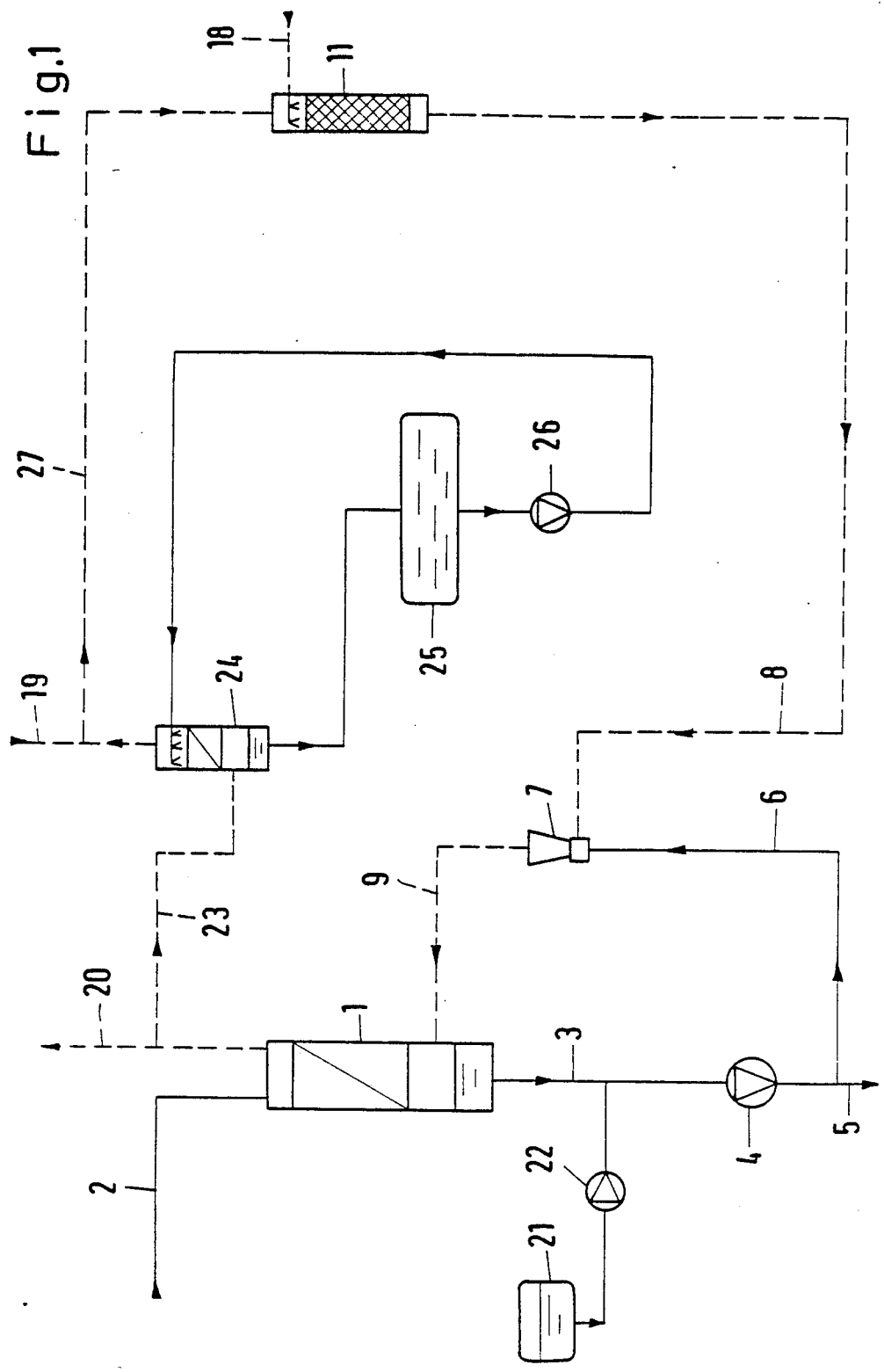

United States Patent [19]

Mandrin et al.

[11] Patent Number: 4,937,004
[45] Date of Patent: Jun. 26, 1990

[54] METHOD AND APPARATUS FOR DEOXIDATION OF CHLORINATED WATER

[75] Inventors: Charles Mandrin, Winterthur; Rene Keller, Zell, both of Switzerland

[73] Assignee: Sulzer Borthers Limited, Winterthur, Switzerland

[21] Appl. No.: 308,262

[22] Filed: Feb. 9, 1989

[30] Foreign Application Priority Data

Feb. 18, 1988 [CH] Switzerland .................. 0592/88

[51] Int. Cl.⁵ .............................................. C02F 1/68
[52] U.S. Cl. ........................................ 210/750; 55/46; 55/71; 55/53; 55/196; 210/756; 210/202
[58] Field of Search ............... 55/46, 48, 51, 53, 71, 55/89, 196, 225, 229; 210/750, 756, 188, 202

[56] References Cited

U.S. PATENT DOCUMENTS

| | | | |
|---|---|---|---|
| 4,017,276 | 4/1977 | Bloem | 55/51 |
| 4,193,774 | 3/1980 | Pilat | 55/229 X |
| 4,460,552 | 7/1984 | Zakrzewski | 423/210 |
| 4,530,820 | 7/1985 | Henriksen | 423/219 |
| 4,752,306 | 6/1988 | Henriksen | 55/53 X |
| 4,765,807 | 8/1988 | Henriksen | 55/51 |

FOREIGN PATENT DOCUMENTS 0234771 9/1987 European Pat. Off. .
2264772 10/1975 France .
0662803 10/1987 Switzerland .

OTHER PUBLICATIONS

Derwent Abstract No. C87-136,946, 10-30-87.

Primary Examiner—Charles Hart
Attorney, Agent, or Firm—Kenyon & Kenyon

[57] ABSTRACT

The method for the deoxidation of chlorinated water, more particularly sea water, by means of a low oxygen content stripping gas, comprises a closed circuit in which a liquid absorbent circulates. For dechlorination, the liquid absorbent is brought into contact in an absorption column with the stripping gas charged with oxygen and chlorine. The absorbent is of a nature not to absorb at least one of the components comprising carbon dioxide, oxygen and hydrocarbons, and is fed to the absorption column by a pump from a reservoir in the circuit.

14 Claims, 3 Drawing Sheets

METHOD AND APPARATUS FOR DEOXIDATION OF CHLORINATED WATER

This invention relates to a method and apparatus for deoxidation of chlorinated water.

Heretofore, it has been known to force oil out of oil fields or oil sources by means of a gas or water under pressure. Frequently, oil reserves of this kind are found beneath a sea bed. In such cases, the oil has been recovered by means of installations which may be mounted on artificial islands or rigs or platforms or in some cases on ships.

As is also known, natural sea water contains about 10 ppm of dissolved oxygen, corresponding to the partial pressure of oxygen in the atmosphere. Since this oxygen content of the sea water is inadmissibly high for the above purposes, particularly because of the extremely aggressive corrosion of parts of the installation and piping which is caused by oxygen as well as the risk of clogging by algae which develop in, large quantities with this oxygen content, the sea water must be extensively deoxidized, i.e. to at least 20 ppb oxygen content.

In the past, various types of techniques have been known for deoxidizing water, particularly sea water, such as described in U.S. Pat. No. 4,530,820. In such cases, the oxygen which is dissolved in the water is to be removed by means of a substantially oxygen free stripping gas.

It has also been known to add a chlorinating agent such NaOCl, in water in order to suppress the growth of aerobic algae. The disinfectant effect is caused by the chlorine which is formed by a spontaneous decomposition of the chlorinating agent in the water.

Gases brought into contact with water chlorinated in this way usually contain not more than 0.5 ppm of chlorine. This is equivalent to the statutorily prescribed Mak value, which corresponds to the permissible chlorine content of gases that can be tolerated by man. In methods and installations such as described in the U.S. Pat. No. 4,530,820, the oxygen absorbed by the stripping gas from the water is catalytically removed and the stripping gas which is regenerated in this way is again brought into contact with water. However, the oxygen charged stripping gas also contains chlorine, since the gas becomes chlorinated during contact with the chlorinated water due to the decomposition of the chlorinating agent. This poses a problem in attempting to catalytically remove oxygen from the gas since noble metal catalysts suitable for the oxygen elimination are extremely chlorine-sensitive. For example, palladium becomes inactive after a short time.

Although it is known to wash chlorine out of a chlorine-containing gas by means of a highly alkaline solution, e.g. caustic soda solution, such washing entails a very high consumption of chemicals, particularly if the stripping gas contains carbon dioxide. Carbon dioxide also reacts strongly with caustic soda solution and all other highly alkaline solutions, e.g. caustic potash. Also, the carbon dioxide concentration is many factors higher than the chlorine concentration in stripping gas charged with chlorine and oxygen.

By way of example, a typical injection plant would use about 50 kg per annum of caustic soda solution to absorb chlorine and 50 t/annum caustic soda solution would be uselessly destroyed because of the reaction with carbon dioxide.

The annual stock of 50 t of caustic soda solution (corresponding to 150 t in the case of a 30% solution) would be intolerable particularly on ships and drilling rigs, for reasons of space and weight. In comparison, a complete injection plant containing water filters, deoxidation apparatus and high-pressure pumps, and the like, would have a weight of only about 100 to 200 tons.

If hydrogen is used as fuel in a catalytic combustion, the circulating stripping gas does not contain any carbon dioxide and the caustic soda solution consumption would remain within tolerable limits. However, dechlorination of the sea-water takes place in the contact apparatus since the chlorine partial pressure of the stripping gas at the entry to the apparatus is zero unless some action is taken. This promotes decomposition of the chlorinating agent (e.g. NaOCl) and thus increases the chlorine concentration in the stripping gas at the contact apparatus outlet. Thus, the disinfectant action in the injected water is also reduced.

The above explanations relate to deoxidation processes in which the stripping gas flows through a closed circuit (cf U.S. Pat. No. 4,530,820). However, the same problems occur if the stripping gas does not flow through a closed circuit but originates from an external source and, after becoming charged with oxygen, is recovered or disposed of in some way without recycling. This is an open circuit stripping.

For economic reason, the stripping gas used for open circuit will always be natural gas. It is well known that this is chlorine-free. However, on contact with chlorinated water, nitrogen becomes chlorinated for the above reasons, i.e. decomposition of the water chlorinating agent. After being brought into contact with water, it is impossible, for economic and/or safety reasons and regulations, to burn off the natural gas which contains the chlorine and oxygen and which also always contains carbon dioxide. There are numerous recovery possibilities for the natural gas.

One possibility is to deliver the natural gas by a separate compressor to the combustion chamber of a gas turbine. However, the chlorine would corrode the hot parts of the gas turbine and must therefore be removed selectively beforehand. In this case, the oxygen does not have to be separated.

Another possibility is to inject the gas into a borehole by means of an existing compressor (gas injection) or feed the gas into a pipeline leading to a consumer. Removal of chlorine from the natural gas is necessary in each case for such recovery.

Accordingly, it is an object of the invention to economically deoxidize chlorinated water.

It is another object of the invention to be able to dechlorinate a chlorinated stripping gas used in the deoxidation of chlorinated water in a simple and economic manner.

It is another object of the invention to minimize the chlorine losses in a chlorinated water on contact with a stripping gas.

Briefly, the invention provides a method and apparatus for deoxidizing chlorinated water, such as sea water.

In accordance with the method, a flow of chlorinated water is passed into contact with a flow of stripping gas which is capable of extracting oxygen and chlorine from the chlorinated water. Thereafter, the oxygen and chlorine charged gas is passed into contact with a flow of liquid absorbent capable of extracting chlorine from the gas while leaving the oxygen in the gas. The liquid absorbent is then recycled to the flow of oxygen and chlorine charged gas in a closed circuit having a reservoir for holding a supply of the liquid absorbent. In this way, the liquid absorbent is used to extract chlorine from the stripping gas in a sequential manner over a period of time. The reservoir provides a means of storing the chlorine charged absorbent over this period of time.

The deoxidized water can be used for any suitable purpose. In addition, a chlorinating agent may be added to the flow of deoxidized water prior to pumping of the flow to an elevated pressure. Thereafter, a partial flow of the pressurized chlorinated and deoxidized water may be passed through a jet pump to form a propellent jet which is used to deliver a flow of stripping gas into contact with a fresh flow of chlorinated water.

The apparatus for deoxidization of the chlorinated water comprises a contact apparatus for passing the flow of chlorinated water into contact with the flow of stripping gas, an absorption apparatus for passing a flow of oxygen and chlorine charged stripping gas in contact with a flow of liquid absorbent, a reservoir connected with the absorption apparatus in a closed circuit and a pump in the circuit for pumping the liquid absorbent therethrough.

In another embodiment, the apparatus includes an agitator in the reservoir for stirring the liquid absorbent therein. In addition, a second reservoir for holding an alkaline solution and a metering pump are provided to meter a flow of the alkaline solution into the reservoir containing the liquid absorbent. The alkaline solution is of such a nature as to replenish the liquid absorbent from time-to-time.

Figure 2:
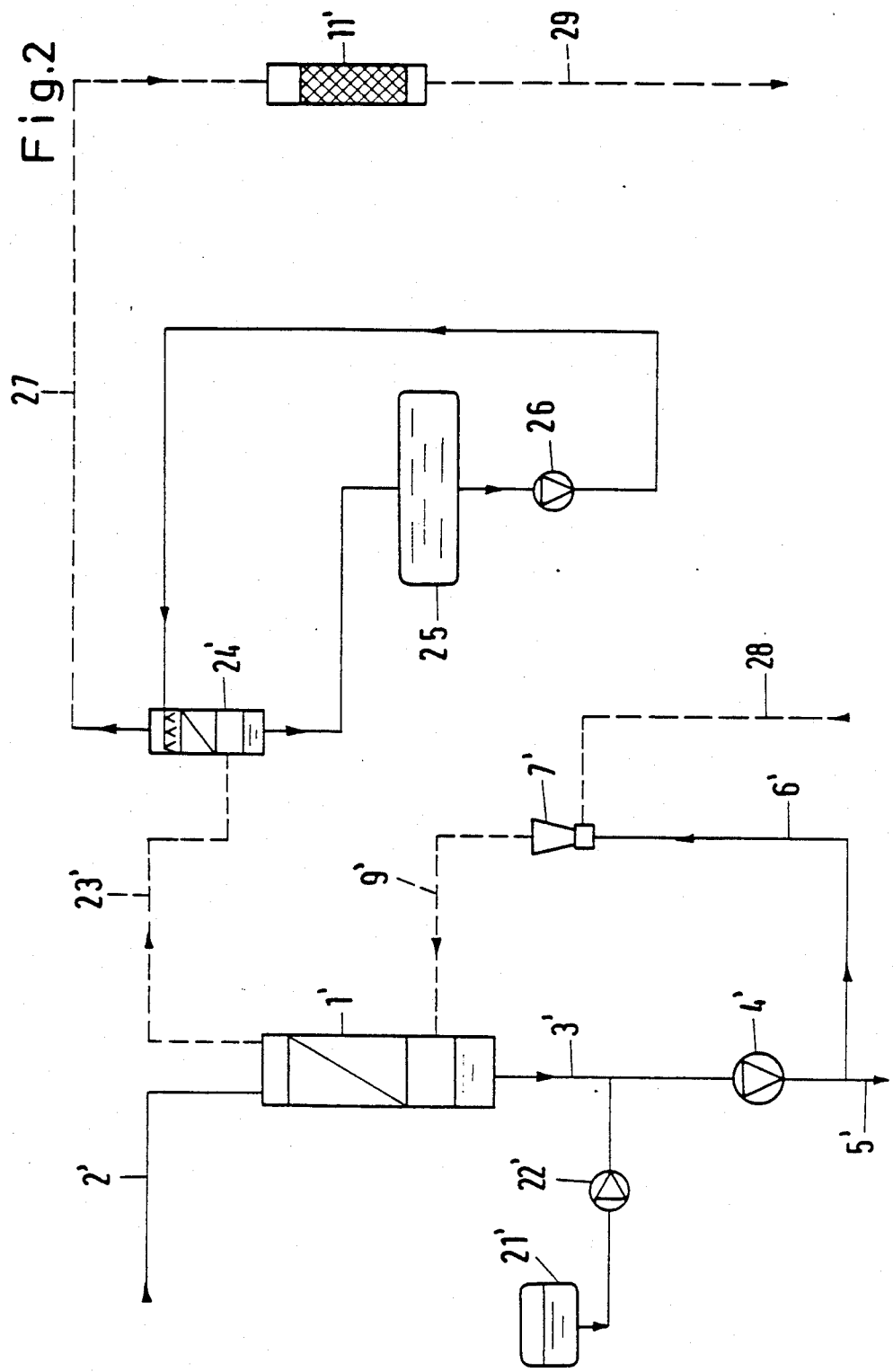
Figure 3:
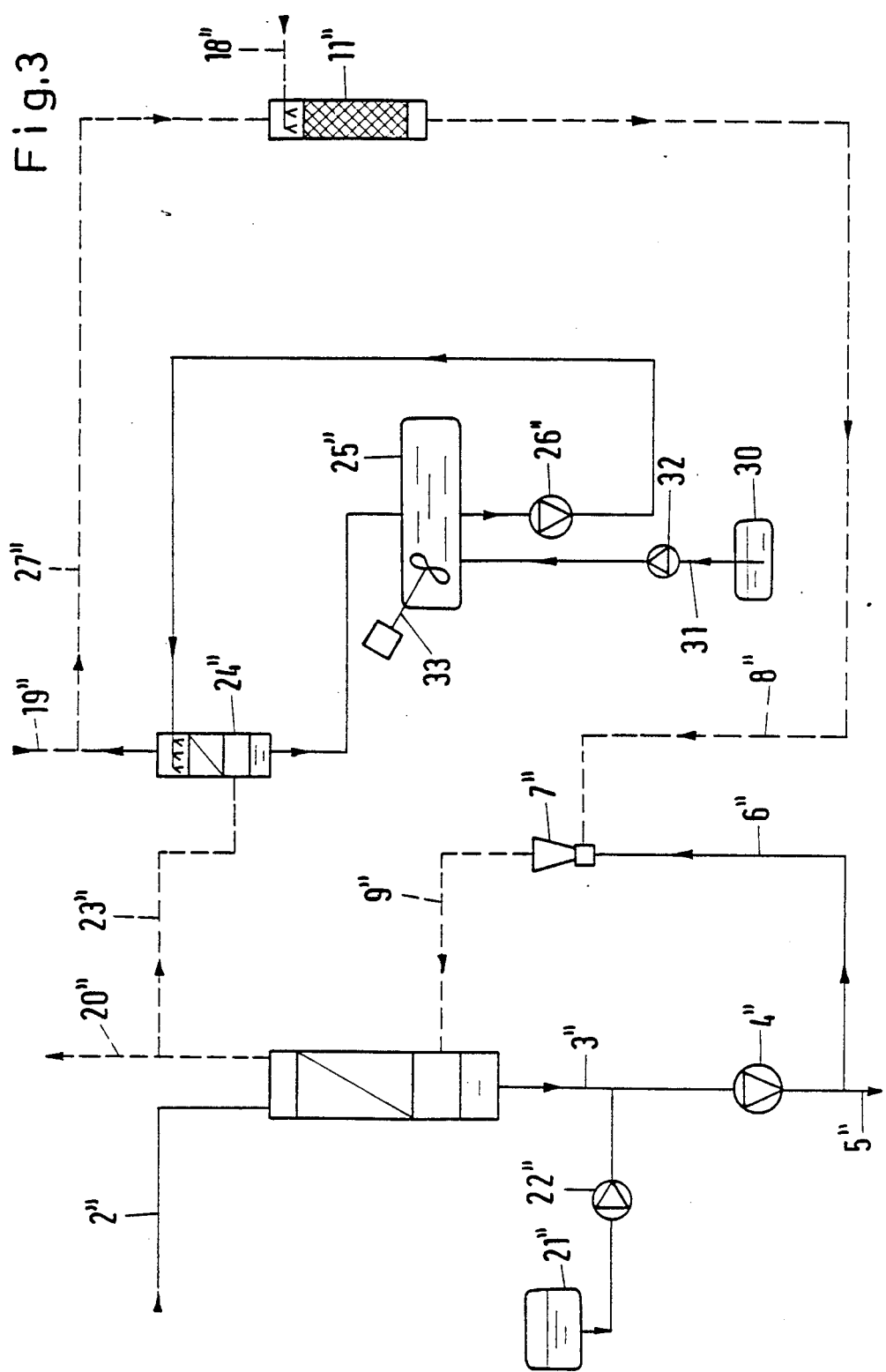

These and other objects and advantages of the invention will become more apparent from the following detailed description taken in conjunction with the accompanying drawings wherein:

FIG. 1 schematically illustrates an apparatus constructed in accordance with the invention;

FIG. 2 schematically illustrates an apparatus similar to that of FIG. 1 wherein the stripping gas is passed through an open circuit; and FIG. 3 illustrates a modified apparatus employing a reservoir for replenishing the liquid absorbent in accordance with the invention.

Referring to FIG. 1, the apparatus includes a contact apparatus in the form of a counter current column 1 which is constructed, for example, with packing elements of the kind described in Swiss Patents No. 398,503 and No. 617,357 or with a packed bed consisting of fillers such as Raschig rings. As illustrated, a pipe 2 is connected to the column 1 for passing a flow of chlorinated water into the column 1. For example, the chlorinated water may be sea water having an oxygen content of about 10 ppm, a temperature of about 8° C. and a pressure of about 4 to 20 bars. A chlorinating agent, such as NaOCl, is previously added (in manner not shown) to the sea water introduced via the pipe 2. The pipe 2 also contains a filter (not shown) which would clog up without chlorination.

In column 1, the chlorinated sea water is deoxidized to about 10 ppb and is fed via a pipe 3 to a high-pressure pump 4 in which the sea water is brought to the required injection pressure of, for example 100 to 250 bars. The high pressure sea water is then injected into a borehole through a pipe 5.

Chlorine is injected into the deoxidized flow of water leaving the column 1. This is effected by apparatus consisting of a tank 21 containing dissolved NaOCl and a metering pump 22. This additional injection primarily ensures that the water injected via the pipe 5 is chlorinated as required.

A small sub-flow of the chlorinated high pressure water is fed, as a propellent jet, through a pipe 6 to a jet pump 7 disposed in a stripping gas circuit. This jet pump draws in stripping gas through a pipe 8, oxygen having been substantially eliminated from such gas, and forces the gas through a pipe 9 into the column 1. In column 1, the sea water oxygen is substantially extracted from the stripping gas. Saturation of the stripping gas with chlorine is also effected by the chlorinated sea water used as a propellent jet. In comparison with other gasification devices, for example if the stripping gas were fed through a bath containing chlorine, the advantage of the jet pump 7 is that it produces a pressure rise. Saturation of the stripping gas with chlorine means that dechlorination of the chlorinated sea water in the column 1 is substantially reduced.

The stripping gas leaving the column 1 and charged with chlorine and oxygen is fed through a pipe 23 to an absorption apparatus 24 and brought into contact with liquid absorbent. The apparatus 24 may, for example, be a countercurrent column or a static mixer through which the absorbent and the stripping gas flow in co-current. Any other absorption apparatus of known type may be used. The absorbent charged with chlorine is recycled in a closed circuit to the absorption column 24 from a reservoir 25 by means of a pump 26 while chlorine-free stripping gas is fed to a catalyst bed 11 via a pipe 27.

In the present case, the absorbent solution circulating in the absorbent circuit is not regenerated. The capacity of the reservoir 25 is so dimensioned that the concentration of the absorbent solution remains high enough for a long period of operation, e.g. three months. To enable the reservoir 25 to be of small and lightweight construction, the absorbent consumption must be kept low.

The absorbent selected is one which reacts only with chlorine and not with other components of the stripping gas. Since only traces of chlorine, e.g. of about 0.5 ppm, are present in the stripping gas, the consumption is kept extremely small as a result.

Other components of the stripping gas which might react with absorbent solutions are carbon dioxide and oxygen, which are both present in the stripping gas in a concentration of, for example, 1000 to 50000 ppm and they would very rapidly use up the absorbent.

Accordingly, the absorbent selected comprises only dissolved salts of the kind which selectively absorb chlorine. Examples of such absorbents are potassium bicarbonate, sodium bicarbonate, potassium bromide, sodium bromide, potassium iodide and sodium iodide. Further, the aqueous solution may consist of a mixture of at least two of these salts.

The used absorbent solution may be replaced by a fresh charge at the end of a relatively long period of operation lasting some months.

In the exemplified embodiment, a controlled quantity of natural gas may be fed as a combustion gas into the catalyst bed 11 through a pipe 18 as illustrated in FIG. 1. During operation, the oxygen in the stripping gas is substantially removed within the catalyst bed 11 with the regenerated gas leaving the catalyst bed 11 via the pipe 8.

During combustion of the natural gas in the catalyst bed 11, carbon dioxide is produced. Without any further action, the carbon dioxide concentration in the stripping gas would arise appreciably since elimination by soluability in the deoxidized water is insignificant. The water would therefore also have an excessively high carbon dioxide concentration. Accordingly, in order to limit the concentration of carbon dioxide in the circuit, some of the stripping gas is blown off via a pipe 20 connected with the pipe 23 leading from the column 1. This loss of gas and other losses due to the existing soluability of carbon dioxide in the deoxidized water causes the pressure in the stripping gas circuit to fall. Accordingly, in order to maintain a constant pressure in the gas circuit, additional natural gas must be fed via the pipe or else nitrogen or air must be added to the circuit, for example Via pipe 19 connected with the pipe 27 leading to the catalyst bed 11. In the case air is added, the oxygen in the air is combusted in the catalyst bed 11.

FIG. 2 is a flow diagram of a plant for deoxidation and chlorination of the stripping gas, which differs from the embodiment shown in FIG. 1 in that the stripping gas does not circulate in a closed circuit but is fed to the plant from a source outside the plant. Also, after passing through the deoxidation stage, the dechlorination stage and finally the catalyst stage the gas is fed on to some other destination, e.g. after compression, is fed to a gas turbine or to a pipeline or a borehole.

In order to avoid repetition, those parts of the plant and piping which correspond to FIG. 1 have the same reference numerals followed by an apostrophe.

As illustrated, the jet pump 7' draws natural gas free from oxygen and chlorine from an external source through a pipe 28. One function of the jet pump 7' is to compress the natural gas used as the stripping gas so that the pressure in a discharge pipe 29 from the catalyst bed 11' corresponds to the input pressure of the natural gas in front of the jet pump 7'.

A higher compression pressure in excess of the pressure drop in the column 1', the washing column 24' and the catalyst bed 11', is advantageous if the construction of the jet pump 7' and the energy of the propellant jet (pipe 6') so permit.

Stripping gas charged with oxygen and chlorine leaves the column 1' through a pipe 23' and passes to a washing column 24'.

The purpose of the washing column 24' is to remove the chlorine from the stripping gas as has been described in detail with reference to FIG. 1. In principle, of course, natural gas is chlorine-free, but chlorination of the natural gas will take place due to dechlorination of the water in column 1'.

In the present case, a catalyst bed 11' is not always necessary in most cases, because fuel with a low oxygen content, for example 0.7% is suitable for a gas turbine. In such cases, the removal of chlorine from the stripping gas is necessary to protect the downstream apparatus.

FIG. 3 is basically the same as the plant shown in FIG. 1 except for a modified improved embodiment of the adsorbent circuit. Those parts of the plant which correspond to FIG. 1 have the same references followed by a double apostrophe.

It should also be pointed out that this construction of the absorbent circuit can of course advantageously be used in a plant of the kind shown in FIG. 2.

In the absorbent circuit shown in FIG. 3, a smaller reservoir 30 is provided in comparison with the reservoir 25" and is connected to the tank 25" via a feed line 31 containing a metering pump 32. In addition, an agitator 33 is disposed in the tank 25".

In the exemplified embodiment, the aqueous absorbent contains potassium iodide and L-ascorbic acid on starting up. The potassium iodide reacts with chlorine in the absorbent column 24" and forms potassium chloride and iodine. The iodine reacts with the L-ascorbic acid and forms iodic acid and dehydro-L-ascorbic acid. The advantage of this secondary reaction is that iodic acid has a much higher solubility than iodine.

Another advantage is that the potassium iodide used up in the first stage of the process can be restored, by feeding an alkaline solution to the reservoir 25" from the smaller reservoir 30 by means of the metering pump 32. The alkaline solution also contains potassium. The potassium-containing alkaline solvent reacts with the iodic acid contained in the large reservoir 25" and forms potassium iodide and water. The potassium iodide used up is thus replaced.

In this case, the plant uses only alkali-metal salts, e.g. caustic potash or potassium carbonate, which are of course inexpensive. The same also applies to the L-ascorbic acid. Potassium chloride and dehydro-L-ascorbic acid also form as waste products in the solvent and collect in the absorption circuit, but only in quantities equivalent to the absorbed chlorine. After a relatively long period, the absorbent solvent is replaced. Potassium iodide, which is a very expensive agent, is not used up and can be recovered from the withdrawn solution. The addition of the alkaline potassium-containing solvent is so adjusted that the pH of the aqueous solution is kept constant or is periodically corrected by continuous or periodic addition of a solution containing the alkali metal. This regulation can be completely automated which is of great advantage particularly for oil rigs, since no further laboratory analyses are necessary.

Another advantage of this embodiment is that the potassium-containing alkaline solution never comes into contact with carbon dioxide.

Although it is particularly advantageous for oil sources situated beneath the seabed, the method and apparatus described may also be used in mainland plants for extracting oil from oil sources situated beneath the surface of the earth. In that case, the stripping gas may, if required, be freshwater which must also be deoxidized and chlorinated before injection into the oil sources.

The invention thus provides a method and apparatus for the deoxidization of chlorinated water which is economical.

Further, the invention provides a method which permits a reduction of chlorine losses in a chlorinated water during contact with an oxygen stripping gas.

What is claimed is:

1. A method of deoxidizing chlorinated water comprising the steps of:
    passing a flow of chlorinated water into contact with a flow of stripping gas capable of extracting oxygen and chlorine from the chlorinated water to transfer oxygen and chlorine from the water into the gas;
    thereafter passing the oxygen and chlorine-charged gas into contact with a flow of liquid absorbent capable of extracting chlorine from the gas while leaving oxygen in the gas; and
    recycling the liquid absorbent to the flow of oxygen and chlorine-charged gas in a closed circuit having a reservoir therein for holding a supply of liquid absorbent.

2. A method as set forth in claim 1 which further comprises the step of adding a chlorinating agent to the flow of stripping gas prior to contact with the flow of water.

3. A method as set forth in claim 1 which further comprises the steps of adding a chlorinating agent to a flow of the deoxidized water, thereafter pumping the flow of deoxidized water to an elevated pressure, passing a partial flow of the pressurized deoxidized water through a jet pump to form a propellant jet and passing a flow of stripping gas into said propellant jet for delivery into contact with the flow of chlorinated water.

4. A method as set forth in claim 1 wherein the liquid absorbent is incapable of absorbing carbon dioxide or hydrocarbons.

5. A method as set forth in claim 1 wherein the liquid absorbent is an aqueous solution of at least one salt selected from the group consisting of potassium bicarbonate, sodium bicarbonate, potassium bromide, sodium bromide, potassium iodide and sodium iodide.

6. A method as set forth in claim 5 wherein the aqueous solution consists of a mixture of at least two of said salts.

7. A method as set forth in claim 1 wherein the liquid absorbent is an aqueous solution containing one of a bromide and an iodide of an alkali metal and an oxidant, wherein the bromide or the iodide first reacts with chlorine to form a chloride of the alkali metal with iodine or bromine being formed, and then the iodine or bromine are reacted with the oxidant to form iodic or bromic acid, and which further comprises the step of maintaining the pH of the aqueous solution constant by addition of a solution containing the alkali metal to again form the bromide or iodide of the alkali metal by reaction with the iodic or bromic acid.

8. A method as set forth in claim 7 wherein the alkali metal is potassium or sodium.

9. A method as set forth in claim 7 wherein the oxidant is ascorbic acid.

10. A method as set forth in claim 7 wherein the alkaline solution consists of at least one of caustic potash, caustic soda, potassium carbonate, potassium bicarbonate, sodium carbonate and sodium bicarbonate.

11. A method as set forth in claim 1 which further comprises the steps of extracting oxygen from the chlorine-depleted oxygen-charged stripping gas to regenerate the gas and re-cycling the regenerated gas into contact with the flow of chlorinated water.

12. A method as set forth in claim 1 wherein the water is seawater.

13. An apparatus for deoxidation of chlorinated water comprising a contact apparatus for passing a flow of chlorinated water into contact with a flow of stripping gas capable of extracting oxygen and chlorine from the chlorinated water;

an absorption apparatus for passing a flow of oxygen and chlorine-charged stripping gas in contact with a flow of liquid absorbent capable of extracting chlorine from the gas while leaving oxygen therein;

a catalyst bed connected to said absorption apparatus to receive a flow of oxygen-charged stripping gas therefrom for extraction of oxygen from the gas;

a jet pump connected to said catalyst bed to receive a flow of oxygen-depleted gas therefrom and said jet pump being connected to said contact apparatus to deliver a flow of stripping gas thereto;

a first reservoir connected with said absorption apparatus in a closed circuit for re-cycling of the liquid absorbent through said absorption apparatus;

a pump in said circuit for pumping liquid absorbent therethrough;

an agitator in said reservoir for stirring liquid absorbent therein;

a second reservoir for holding an alkaline solution therein;

a metering pump connected to and between said reservoirs to meter a flow of alkaline solution into said first reservoir.

14. An apparatus for deoxidation of chlorinated water comprising a contact apparatus for passing a flow of chlorinated water into contact with a flow of stripping gas capable of extracting oxygen and chlorine from the chlorinated water;

an absorption apparatus for passing a flow of oxygen and chlorine-charged stripping gas in contact with a flow of liquid absorbent capable of extracting chlorine from the gas while leaving oxygen therein;

a catalyst bed connected to said absorption apparatus to receive a flow of oxygen-charged stripping gas therefrom for extraction of oxygen from the gas;

a jet pump connected to said catalyst bed to receive a flow of oxygen-depleted gas therefrom and said jet pump being connected to said contact apparatus to deliver a flow of stripping gas thereto;

a reservoir connected with said absorption apparatus in a closed circuit for re-cycling of the liquid absorbent through said absorption apparatus; and a pump in said circuit for pumping liquid absorbent therethrough.

* * * * *